United States Patent
Nakamura

(10) Patent No.: US 8,476,578 B2
(45) Date of Patent: Jul. 2, 2013

(54) ROTARY ENCODER AND ROTATION MECHANISM INCLUDING THE SAME

(75) Inventor: Hitoshi Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 12/968,948

(22) Filed: Dec. 15, 2010

(65) Prior Publication Data

US 2011/0147572 A1 Jun. 23, 2011

(30) Foreign Application Priority Data

Dec. 17, 2009 (WO) .................. PCT/JP2009/071063

(51) Int. Cl.
*G01D 5/34* (2006.01)

(52) U.S. Cl.
USPC ............. 250/231.13; 250/231.16; 250/237 G; 341/11; 341/13

(58) Field of Classification Search
USPC .............. 250/231.13–231.18, 237 G; 341/11, 341/13, 15
See application file for complete search history.

(56) References Cited

U.S. PATENT DOCUMENTS

| 5,241,172 A * | 8/1993 | Lugaresi .................. 250/231.16 |
| 5,528,227 A | 6/1996 | Eguchi |
| 5,774,074 A | 6/1998 | Cooper |
| 8,193,483 B2 * | 6/2012 | Chin et al. ............... 250/231.13 |

FOREIGN PATENT DOCUMENTS

| JP | 5-099693 A | 4/1993 |
| JP | 6-102055 A | 4/1994 |
| JP | 10-227658 A | 8/1998 |
| JP | 2007-178320 A | 7/2007 |

* cited by examiner

*Primary Examiner* — Tony Ko

(74) *Attorney, Agent, or Firm* — Canon U.S.A., Inc., IP Division

(57) ABSTRACT

A rotary encoder includes two first detection units disposed at positions that are symmetrical about a rotation axis, each of the first detection units outputting an incremental signal, and second detection unit that outputs an absolute signal $\phi_A$. The rotary encoder includes a storage unit that stores a plurality of formulas for correcting errors of the incremental signals, the formulas being different from each other in accordance with the signal $\phi_A$, and the errors being generated due to eccentricity; a calculation unit that calculates a corrected phase $\phi_I$ by performing operation on the incremental signals by using one of the formulas corresponding to the signal $\phi_A$; and a generation unit that generates a rotation angle of the scale on the basis of the phase $\phi_I$ and the signal $\phi_A$.

4 Claims, 5 Drawing Sheets

FIG. 4

| FORMULA 1 | if($|\phi1-\phi2|<=\pi$){<br>   $\phi I=(\phi1+\phi2)/2$<br>}else if($(\phi1+\phi2)/2>=\pi$){<br>   $\phi I=(\phi1+\phi2)/2-\pi$<br>}else{<br>   $\phi I=(\phi1+\phi2)/2+\pi$<br>} |
|---|---|
| FORMULA 2 | if($\phi1>=\phi2$){<br>   $\phi I=(\phi1+\phi2)/2$<br>}else if($(\phi1+\phi2)/2>=\pi$){<br>   $\phi I=(\phi1+\phi2)/2-\pi$<br>}else{<br>   $\phi I=(\phi1+\phi2)/2+\pi$<br>} |
| FORMULA 3 | if($|\phi1-\phi2|>=\pi$){<br>   $\phi I=(\phi1+\phi2)/2$<br>}else if($(\phi1+\phi2)/2>=\pi$){<br>   $\phi I=(\phi1+\phi2)/2-\pi$<br>}else{<br>   $\phi I=(\phi1+\phi2)/2+\pi$<br>} |
| FORMULA 4 | if($\phi1<=\phi2$){<br>   $\phi I=(\phi1+\phi2)/2$<br>}else if($(\phi1+\phi2)/2>=\pi$){<br>   $\phi I=(\phi1+\phi2)/2-\pi$<br>}else{<br>   $\phi I=(\phi1+\phi2)/2+\pi$<br>} |

FIG. 5

| RANGE OF ROTATION ANGLE $\theta$ | FORMULA |
|---|---|
| $0 \leq \theta < \theta1$ | FORMULA 1 |
| $\theta1 \leq \theta < \theta2$ | FORMULA 2 |
| $\theta2 \leq \theta < \theta3$ | FORMULA 3 |
| $\theta3 \leq \theta < \theta4$ | FORMULA 4 |
| $\theta4 \leq \theta < \theta5$ | FORMULA 3 |
| $\theta5 \leq \theta < \theta6$ | FORMULA 2 |
| $\theta6 \leq \theta < \theta7$ | FORMULA 1 |
| $\theta7 \leq \theta < \theta8$ | FORMULA 4 |
| $\theta8 \leq \theta < \theta9$ | FORMULA 3 |
| $\theta9 \leq \theta < \theta10$ | FORMULA 2 |
| $\theta10 \leq \theta < \theta11$ | FORMULA 3 |
| $\theta11 \leq \theta < \theta12$ | FORMULA 4 |
| $\theta12 \leq \theta < 2\pi$ | FORMULA 1 |

ROTARY ENCODER AND ROTATION MECHANISM INCLUDING THE SAME

FIELD OF THE INVENTION

The present invention relates to an absolute rotary encoder that detects a rotation angle on the basis of an absolute signal and an incremental signal, with higher precision than on the basis of only the absolute signal.

DESCRIPTION OF THE RELATED ART

Some existing rotary encoders include a sensor and a scale that rotates relative to the sensor, the scale having a pattern having a center that coincides with the center of rotation, and detect the rotation angle of the scale by detecting a change in the pattern by using the sensor.

In such an encoder, if the center of the pattern is deviated from the center of rotation, the detected angle includes an eccentric error, which is a periodic error having a characteristic of a sinusoidal wave having a period for one rotation. Therefore, it is necessary to take measures against the eccentric error in order to detect the rotation angle with high precision. However, in reducing the deviation of the center of the pattern from the center of rotation, a problem arises in that the precision of the components and the precision of assembling have to be increased and thereby the cost may be increased. With consideration of the characteristic of the eccentric error, a method corrects the eccentric error by averaging rotation angles obtained by two sensors disposed at positions that are symmetrical about the rotation center.

There are two types of encoder, that is, incremental encoders and absolute encoders. Some absolute encoders detect an angular position with high precision by using an incremental signal, which represents a high-precision relative rotation amount, and an absolute signal, which represents an angular position within one rotation.

PTL 1 describes a rotary encoder that includes sensors disposed at positions that are symmetrical about a shaft axis, which is the center of rotation of a code plate. The rotary encoder corrects an eccentric error and detects a rotation angle using an absolute signal and an incremental signal. The encoder includes a code plate that is disposed between a light source and a photodetector array including four photoelectric conversion elements. Slits and light-shielding portions are alternately arranged on the code plate, which is connected to a shaft axis. The encoder generates two incremental signals $\sin\phi$ and $\cos\phi$ by using signals that are obtained by the four photoelectric conversion elements, and calculates a phase angle $\phi$ by making the two signals be addresses of a ROM.

When two sets of light sources and the photodetector arrays are disposed so as to face each other with a rotation axis therebetween, incremental signals obtained by the two photoconductor arrays can be represented by $\sin(\phi+\delta)$ and $\cos(\phi+\delta)$, and $\sin(\phi-\delta)$ and $\cos(\phi-\delta)$, where $\delta$ denotes an eccentric error. A phase angle $\phi$ is calculated by using two signals that are respectively the sum of $\sin(\phi+\delta)$ and $\sin(\phi-\delta)$ and the sum of $\cos(\phi+\delta)$ and $\cos(\phi-\delta)$, so that the influence of the eccentric error is cancelled.

CITATION LIST

Patent Literature

PTL 1: Japanese Patent Laid-Open No. 5-099693

SUMMARY OF INVENTION

In the structure described in PTL 1, the value of the eccentric error $\delta$ periodically changes, and the range of the change depends on the deviation of the center of slits from the center of rotation (eccentricity) and the pitch of the slits formed in the code plate. At a certain angular position, $\delta=\pi/2$ if $\epsilon\leq\lambda/2$, where $\epsilon$ is the eccentricity, and $\lambda$ is the pitch of the slits. In this case, the phase angle cannot be calculated because $\sin(\phi+\pi/2)+\sin(\phi-\pi/2)=0$ and $\cos(\phi+\pi/2)+\cos(\phi-\pi/2)=0$. This situation occurs because the phases of the two incremental signals, which are detected by two sets of sensors, are shifted from each other by one period. Even if the eccentricity $\epsilon<\lambda/2$, the two signals $\sin(\phi+\delta)+\sin(\phi-\delta)$ and $\cos(\phi+\delta)+\cos(\phi-\delta)$ are small if $\delta$ is close to $\pi/2$, so that the precision may decrease.

Therefore, with the structure described in PTL 1, it is necessary to make the eccentricity $\epsilon$ be in the range such that $\epsilon<\lambda/2$. An aspect of the present invention is to correct the eccentric error while allowing a wider range of deviation.

A rotary encoder according to the present invention uses different formulas for correcting an eccentric error in accordance with the value of an absolute signal when calculating the phase of one incremental signal, whose eccentric error is corrected, by using the phases of two incremental signals that are output by two detection units and that include eccentric errors.

According to another aspect of the present invention, a rotary encoder includes a detection unit, and a scale that is rotatable relative to the detection unit, the scale having a pattern for detecting a rotation angle, wherein the detection unit includes two first detection units and second detection unit, the two first detection units being disposed at positions that are symmetrical about a center of the rotation, each of the first detection units outputting an incremental signal having a plurality of periods for one rotation of the scale, and the second detection unit outputting an absolute signal corresponding to a rotation angle of the scale within one rotation of the scale, and wherein the rotary encoder detects a relative rotation angle of the scale based on phases of the two incremental signals and a value of the absolute signal, the phases of the two incremental signals being detected by the two first detection units, the rotary encoder including a storage unit that stores a plurality of formulas for correcting errors of the incremental signals, the formulas being different from each other in accordance with the value of the absolute signal, and the errors being generated due to deviation of the center of the rotation from a center of the pattern; a calculation unit that calculates a corrected phase of an incremental signal by performing an operation on the phases of the two incremental signals by using one of the formulas corresponding to the value of the absolute signal that is output from the second detection unit; and a generation unit that generates the rotation angle of the scale on the basis of the corrected phase of the incremental signal and the value of the absolute signal.

Further features of the present invention will become apparent from the following description of exemplary embodiments with reference to the attached drawings.

BRIEF DESCRIPTION OF DRAWINGS

FIG. 4 illustrates formulas according to the aforementioned embodiment of the present invention.

FIG. 5 illustrates a table that is stored in a storage unit according to the present invention.

DESCRIPTION OF EMBODIMENTS

A rotary encoder according to an embodiment of the present invention will be described next.

First, the structure of the rotary encoder according to the embodiment of the present invention will be described.

Figure 1:
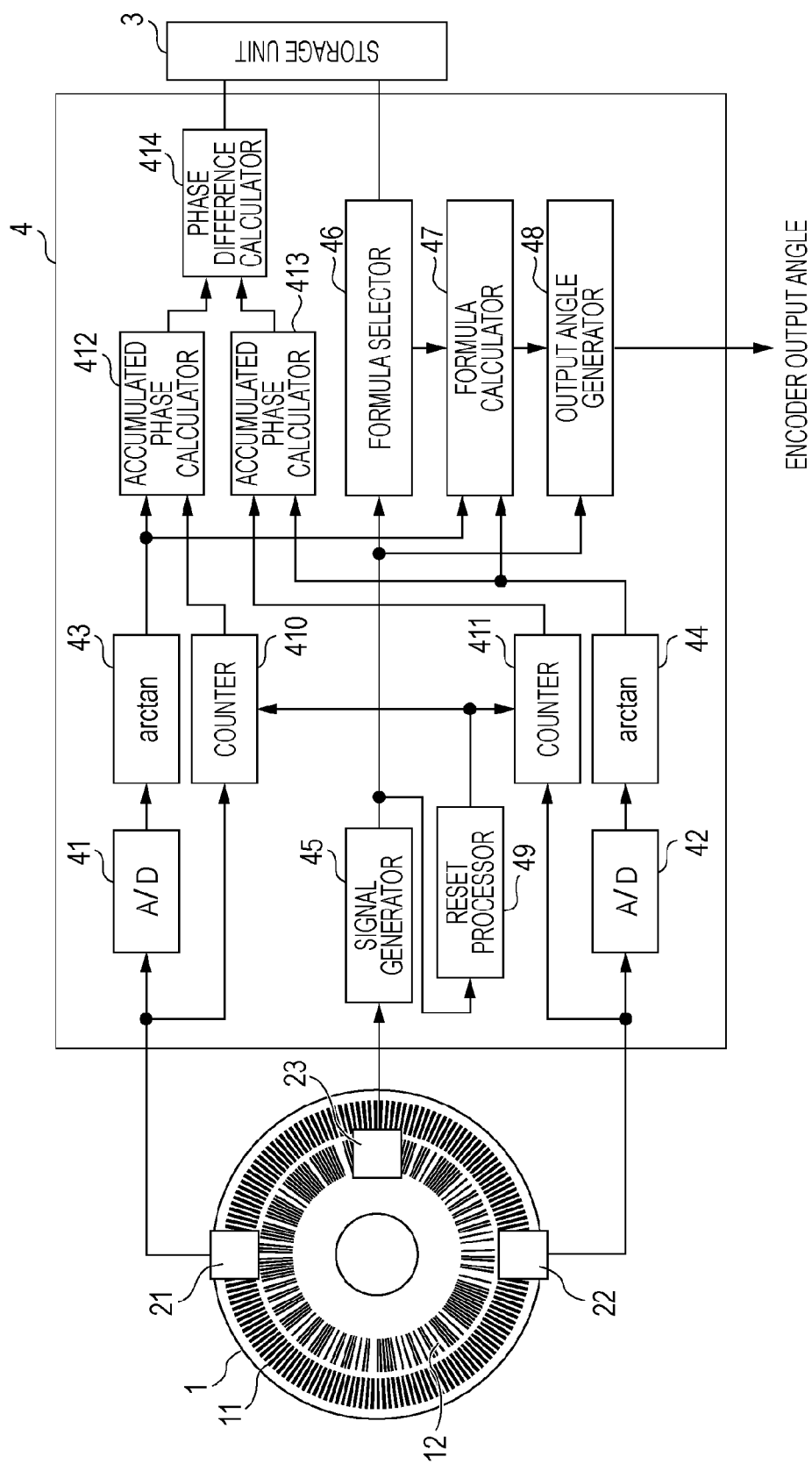
FIG. 1 is a block diagram of an encoder according to an embodiment of the present invention.
Figure 2A:
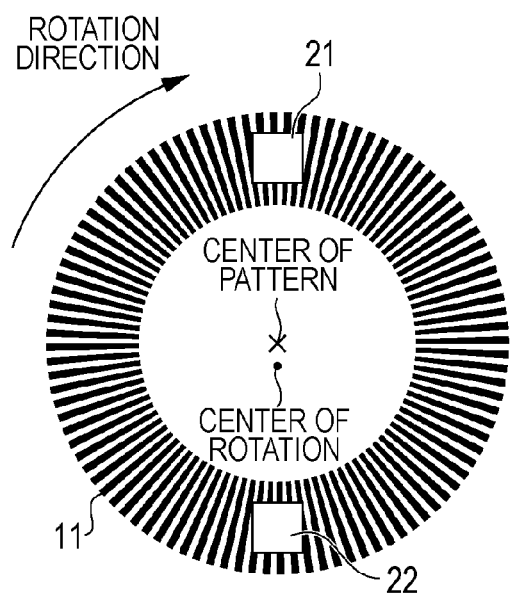
FIGS. 2A to 2D are schematic views illustrating the positional relationship between a track and sensors when eccentricity exists.
Figure 2B:
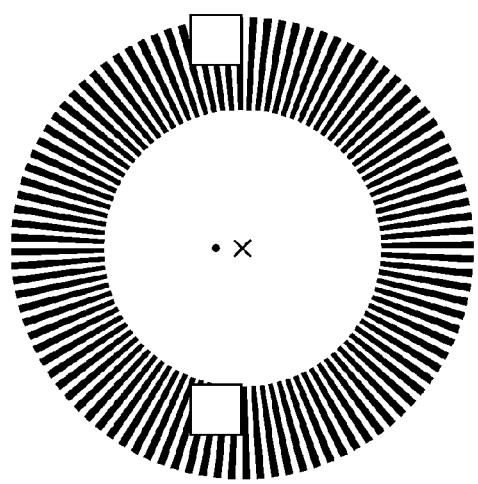
Figure 2C:
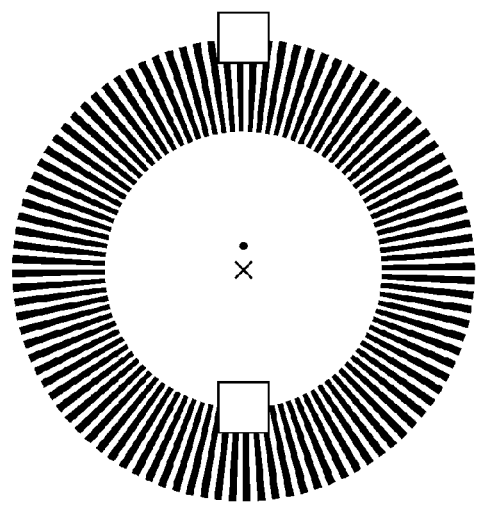
Figure 2D:
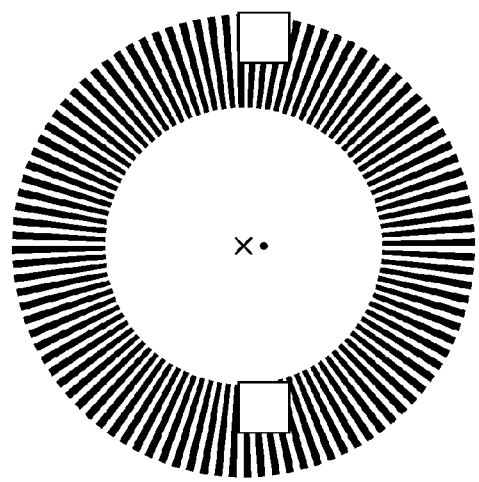

FIG. 1 is a block diagram of the rotary encoder according to the embodiment of the present invention. Referring to FIG. 1, the rotary encoder includes a scale 1, two first sensor units (first detection unit) 21 and 22, a second sensor unit (second detection unit) 23, a storage unit (storage unit) 3, and a controller 4.

A first track 11 and a second track 12 are formed on the scale 1. As the first track 11 rotates, incremental signals are output from the two first sensor units 21 and 22. As the second track 12 rotates, an absolute signal is output from the second sensor unit 23. The controller 4 performs an operation on the signals, which are output by the first and second sensor units 21, 22, and 23, by using a formula stored in the storage unit 3 to calculate a rotation angle (rotation amount) of the scale. When the scale 1 is attached to a test object, the scale 1 rotates together with the test object. Therefore, the rotation angle of the test object can be detected by detecting the rotation angle of the scale 1 by using the first and second sensor units.

The two first sensor units 21 and 22 are disposed at positions that are symmetrical about the rotation center of the scale 1. The second sensor unit 23 may be disposed at any position with respect to the first sensor units 21 and 22. In the present embodiment, the second sensor unit 23 is disposed at 90 degrees with respect to the first sensor units 21 and 22 around the rotation axis.

Next, detection of the rotation angle, and the operation of outputting an angle will be described.

The first track 11 includes reflective portions having slit-like shapes and non-reflective portions having slit-like shapes. The reflective portions and the non-reflective portions are alternately arranged at a regular pitch. Each of the two first sensor units 21 and 22 includes a light source (not shown) and a photodetector (not shown), and detects a change in the position at which a light beam, which is emitted by the light source and reflected by the reflective portions of the first track 11, is incident on the photodetector. Each of the two first sensor units 21 and 22 generates a two-phase sinusoidal signal (incremental signal) of sin $\phi$ and cos $\phi$ having a plurality of periods for one rotation of the scale.

The track 12 includes reflective portions having slit-like shapes and non-reflective portions having slit-like shapes. The reflections portions and the non-reflective portions are arranged in an M-series pattern. As with the first sensor units 21 and 22, the second sensor unit 23 includes a light source (not shown) and a photodetector (not shown), and detects a change in the position at which a light beam, which is emitted by the light source and reflected by the reflective portions of the second track 12, is incident on the photodetector. The second sensor unit 23 outputs an M-series signal (absolute signal) that corresponds to a rotation angle of the scale 1 within one rotation.

An A/D converter 41 and an arctan calculator 43 respectively perform A/D conversion and arctan calculation on the two-phase sinusoidal signal generated by the sensor unit 21 so as to convert the two-phase sinusoidal signal to a phase signal $\phi_1$ of the incremental signal. In the same manner, an A/D converter 42 and an arctan calculator 44 process the two-phase sinusoidal signal generated by the sensor unit 22 so as to convert the two-phase sinusoidal signal to a phase signal $\phi_2$.

A signal generator 45 converts the M-series signal (absolute signal) generated by the sensor unit 23 to a signal $\phi_A$ having a value that represents an angular position. The signal $\phi_A$ is input to a formula selector 46, and one formula is selected from a plurality of formulas stored in the storage unit 3 on the basis of the value of C.

Referring to FIG. 5, the storage unit 3 stores a table of the relationship between the range of the actual rotation angle $\theta$ and the formula. It is assumed that the value of the signal $\phi_A$, which is generated on the basis of the absolute signal, is an actual rotation angle $\theta$, and a formula that corresponds to $\phi_A$ is selected from the table. FIG. 4 illustrates formulas 1 to 4 according to the present embodiment.

The formula selected by the formula selector 46 and the phase signals $\phi_1$ and $\phi_2$ are input to a formula calculator (calculation unit) 47. By inputting the values of $\phi_1$ and $\phi_2$ to the formula and performing calculation, a phase signal $\phi_I$, for which the eccentric error has been corrected, is obtained as a calculation result.

Lastly, the value of the signal $\phi_A$ and the value of the phase signal $\phi_I$ are input to an encoder output angle generator (generation unit) 48, which performs an operation on the values of $\phi_A$ and $\phi_I$, whereby an encoder output angle, (i.e., the rotation angle of the scale), is generated and output. The encoder output angle is calculated by using the following equations (1) and (2):

$$n = CEIL(\phi_A/p) \quad (1)$$

$$\theta_{out} = p \times (n-1) + \phi_I \quad (2),$$

where p is an angle for one pitch of the slits of the first track 11, $\theta_{out}$ is the encoder output angle, and n is a number that represents a period to which $\phi_I$ belongs assuming that $\phi_I$ belongs to the first period if the value of $\phi_A$ is 0. CEIL(x) represents the smallest integer that is equal to or larger than x. Thus, the encoder output angle can be detected and output.

Next, the principle behind the correction of an eccentric error according to the present invention will be described.

FIGS. 2A to 2D illustrate the positional relationship between the first track 11 and the sensor units 21 and 22 in a state in which eccentricity exists and the center of pattern is deviated from the center of rotation. In the figure, (•) represents the center of rotation, and (x) represents the center of the pattern of the slits. Referring to FIGS. 2A to 2D, when the scale rotates clockwise, the relationship between the rotation center (•) and the pattern center (x) changes in the order of FIGS. 2A, 2B, 2C, 2D, and 2A.

Let $\theta_a$, $\theta_b$, $\theta_c$, and $\theta_d$ respectively denote the rotation angles for the positional relationships illustrated in FIGS. 2A, 2B, 2C, and 2D. FIGS. 3A, 3B, 3C, and 3D respectively illustrate the relationship among $\phi_1$, $\phi_2$, and $\phi_I$ around $\theta_a$, $\theta_b$, $\theta_c$, and $\theta_d$. In each of the graphs, a dotted line represents $\phi_1$ a solid line represents $\theta_2$, and a broken line represents $\phi_I$. As illustrated in FIGS. 3A to 3D, if the eccentricity exists, the phase shift between $\phi_1$ and $\phi_2$ changes in accordance with the rotation angle. Assuming that that phase of the signal $\phi_I$ is between the phase of $\phi_1$ and the phase of $\phi_2$, the value of signal $\phi_I$ is equal to either $(\phi_1+\phi_2)/2$ or $(\phi_1+\phi_2)/2$ shifted by $\pm\pi$, depending on the shift between the period of $\phi_1$ and the period of $\phi_2$.

Figure 3A:
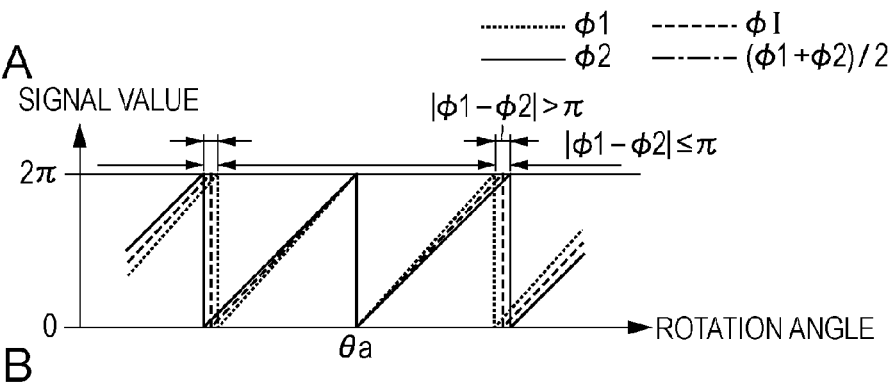
FIGS. 3A to 3E are graphs illustrating the relationship between a rotation angle and the phase of an incremental signal when eccentricity exists.
Figure 3B:
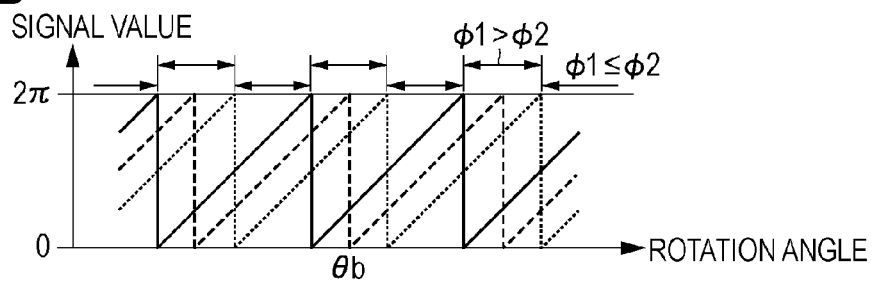
Figure 3C:
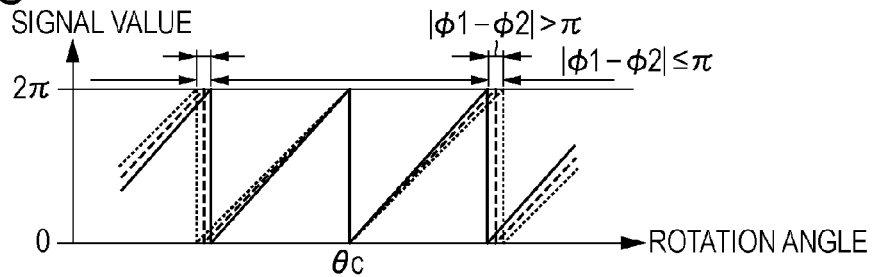
Figure 3D:
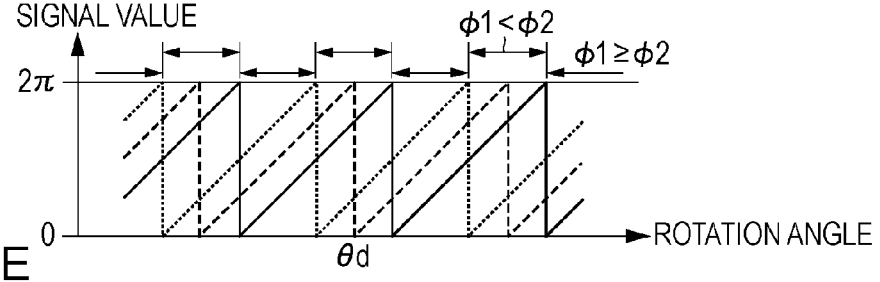
Figure 3E:
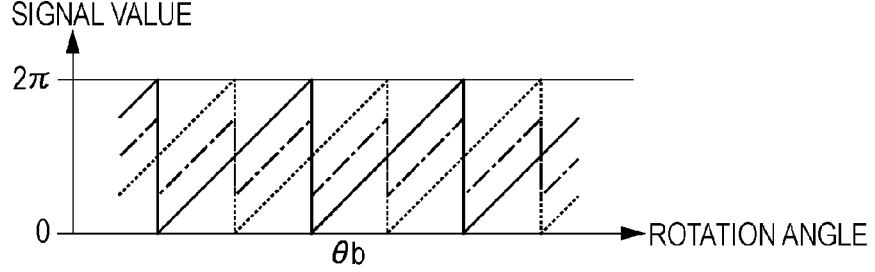

FIG. 3E illustrates the relationship among $\phi_1$, $\phi_2$, and $(\phi_1+\phi_2)/2$ around $\theta_b$. In the figure, an alternate long and short dash line represents $(\phi_1+\phi_2)/2$. As can be seen by comparing FIG.

3B with FIG. 3E, when the angle is around $\theta_b$, $\phi_I$ is equal to $(\phi_1+\phi_2)/2$ shifted by $\pi$ if $\phi_1>\phi_2$ and the angle is smaller than $\theta_b$, and equal to $(\phi_1+\phi_2)/2$ shifted by $\pi$ if $\phi_1>\phi_2$ and the angle is equal to or larger than $\theta_b$. As illustrated in FIG. 3D, when the angle is around $\theta_d$, $\phi_I$ is equal to $(\phi_1+\phi_2)/2$ shifted by it if $\phi_2>\phi_2$ and the angle is smaller than $\theta_d$, and equal to $(\phi_1+\phi_2)/2$ shifted by $\pi$ if $\phi_2>\phi_1$ and the angle is equal to or larger than $\theta_d$.

Likewise, when the angle is around $\theta_a$, $\phi_I$ is equal to $(\phi_1+\phi_2)/2$ shifted by $\pm\pi$ if $\phi_2>\phi_1$ and the angle is equal to or large than $\theta_a$, and equal to $(\phi_1+\phi_2)/2$ shifted by $\pm\pi$ if $\phi_1>\phi 2$ and the angle is smaller than $\theta_a$. When the angle is around $\theta_c$, $\phi_I$ is equal to $(\phi_1+\phi_2)/2$ shifted by $\pm\pi$ if $\phi_1>\phi_2$ and the angle is equal to or large than $\theta_c$, and equal to $(\phi_1+\phi_2)/2$ shifted by $\pm\pi$ if $\phi_2>\phi_2$ and the angle is smaller than $\theta_c$.

In order to suppress an error at the boundary condition, it is preferable that the range for which shifting by $\pm\pi$ is performed be determined by using the following four conditions: $\phi_1\geq\phi_2$, $\phi_1\leq\phi_2$, $|\phi_1-\phi_2|\geq\pi$, and $|\phi_1-\phi_2|\leq\pi$. For example, in a case in which $\phi_1\geq\phi_2$ and $\phi_1\leq\phi_2$ are the ranges for which shifting by $\pm\pi$ is to be performed, if shifting by $\pm\pi$ is mistakenly performed in the range $\phi_1\leq\phi_2$ instead of in the range $\phi_1\geq\phi_2$, an erroneous result may be obtained. Such an error may be suppressed by adding a condition for performing shifting by $\pm\pi$, such as $|\phi_1-\phi_2|\geq\pi$ or $|\phi_1-\phi_2|\leq\pi$, so as to stagger the boundaries.

The conditions for the range for which shifting by $\pm\pi$ is performed is associated with the rotation angle $\theta$ as long as the state of eccentricity does not change. Therefore, the present embodiment uses formulas that are combinations of the calculation of $(\phi_1+\phi_2)/2$ and the calculation of shifting a signal by $\pm\pi$ as illustrated in FIG. 4, and stores a table that represents the correspondence between the range of rotation angle and the formula, which is illustrated in FIG. 5, in the storage unit 3.

Next, an operation of initializing the table stored in the storage unit will be described.

Using the signal $\phi_A$ as an input, a reset processor (reset unit) 49 outputs a reset signal if the value of the signal $\phi_A$ is 0 and resets the values of the counters (count unit) 410 and 411 to be 0. Counters 410 and 411 respectively count the periodicity of sinusoidal incremental signals that are input from the first sensor units 21 and 22. Each of the counters increments the value of the counter by one when a rotational displacement of one slit in a normal direction is detected, and decrements the value of the counter by one when a rotational displacement of one slit in a reverse direction is detected. In the present embodiment, the value of the counter is incremented and decremented by detecting a zero-cross of sin $\phi$ when cos $\phi$ of the two-phase sinusoidal signal has a positive value.

An accumulated phase calculator (accumulated phase calculation unit) 412 calculates an accumulated phase $\phi_{1A}$ using the phase signal $\phi_1$ and the value of the counter 410. $\phi_{1A}$ can be represented by expression (3) using $\phi_1$, where $m_1$ is the value of the counter 410.

$$\phi_1 A = \phi_1 + m_1 \times 2\pi \quad (3)$$

Likewise, an accumulated phase calculator (accumulated phase calculation unit) 413 calculates an accumulated phase $\phi_{2A}$. $\phi_{2A}$ can be represented by expression (4) using $\phi_2$, where $m_2$ is the value of the counter 411.

$$\phi_2 A = \phi_2 + m_2 \times 2\pi \quad (4)$$

Using the accumulated phases $\phi_{1A}$ and $\phi_{2A}$ as inputs, a phase difference calculator (phase difference calculation unit) 414 calculates a phase difference $\Phi$ by using expression (5), and calculates the rotation angle $\theta$ at that moment by using expression (6). N is the number of slits of the first track 11. (One slit is a pair of one reflective portion and one non-reflective portion.)

$$\Phi = \phi_{1A} - \phi_{2A} \quad (5)$$

$$\theta = ((\phi_{1A}+\phi_{2A})/2)/N \quad (6)$$

Figure 6:
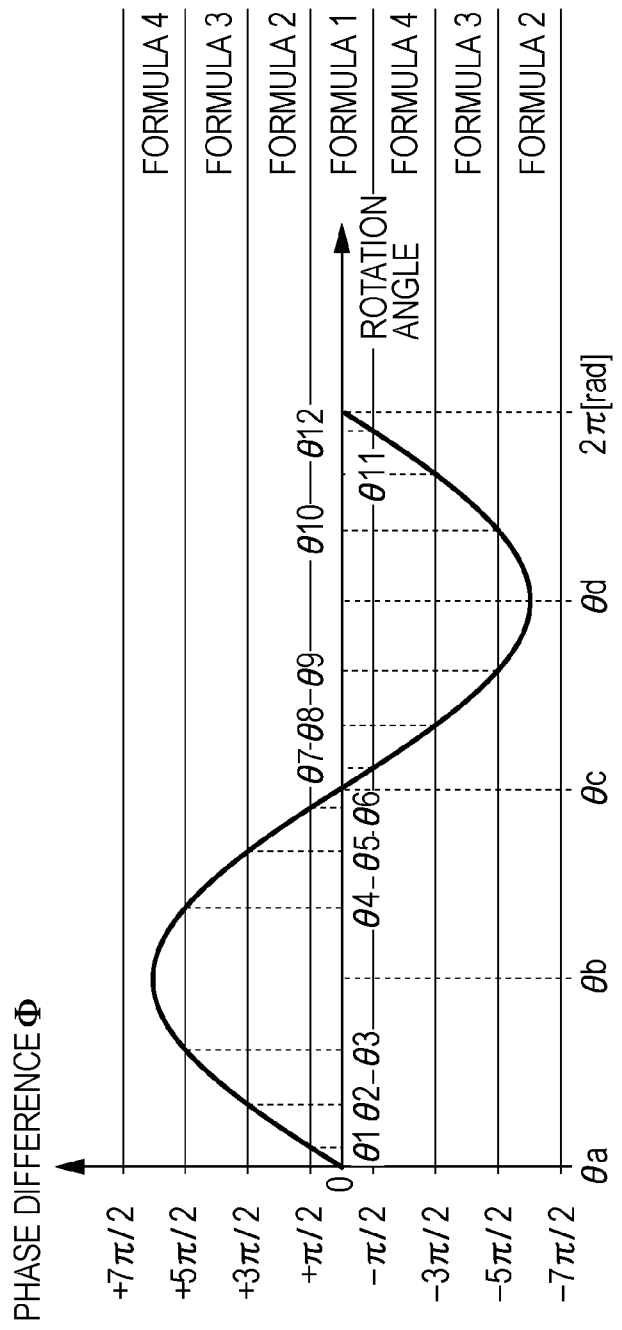
FIG. 6 is a graph illustrating the relationship between the rotation angle of a scale and the phase difference in the incremental signals according to the present invention.

FIG. 6 illustrates the relationship between $\Phi$ and $\theta$, which is obtained by rotating the scale 1 and calculating the phase difference $\Phi$ and the rotation angle $\theta$ at a plurality of positions. Because the condition for the range for which shifting by $\pm\pi$ is performed corresponds to $\Phi$, the relationship between the formula and the range of the rotation angle $\theta$ can be compiled in a table by using the relationship between $\Phi$ and $\theta$.

In the present embodiment, formula 1 is allocated to the range $-\pi/2+4\pi \times i \leq \Phi < \pi/2+4\pi \times i$, formula 2 is allocated to the range $\pi/2+4\pi \times i \leq \Phi < 3\pi/2+4\pi \times i$, formula 3 is allocated to the range $3\pi/2+4\pi \times i \leq \Phi < 5\pi/2+4\pi \times i$, and formula 4 is allocated to the range $5\pi/2+4\pi \times i \leq \Phi < 7\pi/2+4\pi \times i$, where i is an arbitrary integer. Therefore, when $\Phi$ and $\theta$ have the relationship illustrated in FIG. 6, the range formula 1 is allocated to $0 \leq \theta < \theta_1$, formula 2 is allocated to the range $\theta_1 \leq \theta < \theta_2$, etc., so that a table illustrated in FIG. 5 can be compiled.

Lastly, the table that has been compiled is stored in the storage unit 3.

By performing the processing described above, information to be stored in the storage unit are determined, and the storage unit can be initialized when the encoder is attached to a test object. Alternatively, the table may be initialized while the encoder is detecting the angle, so that the storage unit may be dynamically updated.

A rotary encoder according to an embodiment the present invention has been described above. However, the present invention is not limited to the above-described embodiment, and may be realized in other structures.

According to the embodiment described above, the optical encoder is a reflective optical encoder including a sensor unit, which includes a light source and a photodetector, and a reflective scale. However, other types of optical encoders may be used. For example, an optical encoder using a transmissive scale or a magnetic encoder may be used.

In the embodiment described above, the absolute signal is obtained by using a track (second track) having an M-series pattern. However, other methods may be used. For example, a plurality of regular-pitch tracks having different number of slits may be used to output a plurality of incremental signals, and an absolute signal may be generated by using phase difference signals of the incremental signals.

In the embodiment described above, two sensor units for detecting the first track are provided. However, three or more sensor units may be provided, and the rotation angle of the scale may be calculated by using incremental signals obtained by the sensor units.

In the embodiment described above, the scale rotates, and the scale and the sensor units rotate relative to each other. However, in alternative examples of the present invention, the sensor unit may rotate.

In the embodiment described above, the range for shifting the value of $(\phi_1+\phi_2)/2$ by $\pm\pi$ is determined by using four condition s: $(\phi_1\geq\phi_2$, $\phi_1\leq\phi_2$, $|\phi_1-\phi_2|\geq\pi$, and $|\phi_1-\phi_2|\leq\pi$. However, in alternative examples of the present invention, the signal $\phi_I$ can be generated by using at least one of the conditions.

In the embodiment described above, in order to store the plurality of formulas in the storage unit 3, the controller 4 includes the reset processor 49, the counters 410 and 411, the accumulated phase calculators 412 and 413, and the phase difference calculator 414. However, such elements do not need to be included in the controller 4. Desired formulas can be stored, for example, in the storage unit 3 by using such elements as external elements of the encoder, because, after the formulas have been stored in the storage unit 3, the rotation angle of the scale may be generated without using such elements.

Furthermore, the rotary encoder according to the present invention can be applied to a rotation mechanism of a variety of apparatuses.

By providing, to the rotation mechanism, a drive unit that can rotate together with a scale or a sensor unit and a controller that controls the drive unit on the basis of a rotation angle detected by the rotary encoder according to the present invention, the rotation angle can be controlled with a higher precision. For example, the rotary encoder according to the present invention can be applied to an industrial machinery, a robot arm, a precision machining apparatus, a semiconductor exposure apparatus, a semiconductor manufacturing apparatus, and the like. The rotary encoder can be also applied to a image-taking apparatus, a lens apparatus, an electrophotographic image forming apparatus, an inkjet image forming apparatus, and the like.

According to the present invention, provided is a rotary encoder that can correct an eccentric error without limitation on eccentricity and that allows a larger assembling error of a scale.

While the present invention has been described with reference to various exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/071063, filed Dec. 17, 2009, which is hereby incorporated by reference herein in its entirety.

REFERENCE SIGNS LIST

1 scale
11 first track
12 second track
21 first sensor unit
22 first sensor unit
23 second sensor unit
3 storage unit
4 controller
45 signal generator
46 formula selector
47 formula calculator
48 output angle generator

What is claimed is:
1. A rotary encoder including
a detection unit, and
a scale that is rotatable relative to the detection unit, the scale having a pattern for detecting a rotation angle,
wherein the detection unit includes two first detection units and a second detection unit, the two first detection units being disposed at positions that are symmetrical about a center of the rotation, each of the first detection units outputting an incremental signal having a plurality of periods for one rotation of the scale, and the second detection unit outputting an absolute signal corresponding to a rotation angle of the scale within one rotation of the scale, and
wherein the rotary encoder detects a relative rotation angle of the scale based on phases of the two incremental signals and a value of the absolute signal, the phases of the two incremental signals being detected by the two first detection units,
the rotary encoder comprising:
a storage unit that stores a plurality of formulas for correcting errors of the incremental signals, the formulas being different from each other in accordance with the value of the absolute signal, and the errors being generated due to deviation of the center of the rotation from a center of the pattern;
a calculation unit that calculates a corrected phase by performing an operation on the phases of the two incremental signals by using one of the formulas corresponding to the value of the absolute signal that is output from the second detection unit; and
a generation unit that generates the rotation angle of the scale based on the corrected phase and the value of the absolute signal.

2. The rotary encoder according to claim 1, wherein the plurality of formulas include an expression for determining either of the following conditions,
$\phi_1 \geqq \phi_2$, $\phi_1 \leqq \phi_2$, $|\phi_1-\phi_2| \geqq \pi$, and $|\phi_1-\phi_2| \leqq \pi$, where $\phi_1$ and $\phi_2$ are the phases of the two incremental signals that are output from the two first detection units.

3. The rotary encoder according to claim 1, further comprising:
a count unit that counts periodicity of each of the two first detection units;
a reset unit that resets values of the two count unit when the value of the absolute signal is zero;
an accumulated phase calculation unit that calculates accumulated phases from positions at which the values have been reset based on the phases of the two the incremental signals that are output from the two first detection units and the values of the count unit; and
a phase difference calculation unit that calculates a phase difference between the two accumulated phases,
wherein the storage unit stores the plurality of formulas based on a relationship between the phase difference and the rotation angle of the scale.

4. A rotation mechanism comprising:
a drive unit that is rotatable together with the scale or the detection unit; and
a control unit that controls driving of the drive unit based on the rotation angle that is generated by the rotary encoder according to claim 1.

\* \* \* \* \*